United States Patent [19]

Chapman

[11] Patent Number: 4,659,462

[45] Date of Patent: Apr. 21, 1987

[54] APPARATUS FOR PRETREATMENT OF WATER USING A BED OF GRANULAR ACTIVATED CARBON

[75] Inventor: Robert L. Chapman, Redding, Calif.

[73] Assignee: CH$_2$M Hill, Inc., Corvallis, Oreg.

[21] Appl. No.: 790,652

[22] Filed: Oct. 24, 1985

Related U.S. Application Data

[63] Continuation of Ser. No. 605,060, Apr. 30, 1984, abandoned.

[51] Int. Cl.$^4$ ............................ C02F 1/28; C02F 1/52
[52] U.S. Cl. .................................. 210/202; 210/266; 210/275; 210/661
[58] Field of Search ..................... 210/661, 665–667, 210/669, 673, 677, 694, 97, 137, 275, 284, 605, 60, 189, 202, 266, 268

[56] References Cited

U.S. PATENT DOCUMENTS

| | | | |
|---|---|---|---|
| 3,252,899 | 5/1966 | Rice et al. | 210/666 |
| 3,455,820 | 7/1969 | Joyce et al. | 210/694 |
| 3,613,888 | 10/1971 | Harris | 210/275 |
| 3,701,423 | 10/1972 | Lindstol | 210/275 |
| 3,956,134 | 5/1976 | Sturgill | 210/275 |
| 4,086,162 | 4/1978 | Benzaria | 210/661 |
| 4,202,770 | 5/1980 | Gappa et al. | 210/291 |
| 4,274,968 | 6/1981 | Grutsch et al. | 210/266 |
| 4,331,542 | 5/1982 | Emrie | 210/275 |

*Primary Examiner*—Ivars Cintins
*Attorney, Agent, or Firm*—Klarquist, Sparkman, Campbell, Leigh & Whinston

[57] ABSTRACT

A water treatment plant includes a granulated activated carbon bed contactor used in pretreating influent water, including wastewater, prior to any filtration of the water in downstream stages of the plant. The contactor is operable either primarily for adsorption purposes or in a dual role for both adsorption and clarification or flocculation purposes to improve performance of downstream filters. In one embodiment, the carbon bed is partially fluidized and expanded by water flowing upwardly through the bed. This fluidization allows the passage of solids the bed and minimizes the plugging of the bed. The flow rate of water through the bed is adjustable and controllable to establish the degree of solids capture by the bed. Upwash and backwash carbon bed cleaning mechanisms are provided. Furthermore, the contactor has a countercurrent spent carbon removal and fresh carbon introduction system for rejuvenating the bed.

2 Claims, 6 Drawing Figures

APPARATUS FOR PRETREATMENT OF WATER USING A BED OF GRANULAR ACTIVATED CARBON

This application is a continuation of application Ser. No. 06/605,060, filed 4/30/84 now abandoned.

BACKGROUND OF THE INVENTION

1. Field of the Invention

The present invention relates to a water treatment apparatus employing granular activated carbon beds for purification of water.

2. Description of the Prior Art

Commonly, surface water such as lake or river water, or subterranean water, is treated in a municipal water treatment plant for use as potable water. This water often contains materials which can cause a bad taste or odor, or is otherwise harmful. For example, the water may contain organic substances from decaying vegetation, or chemicals from various agricultural or industrial applications, such as pesticides and herbicides.

It is common for waste water and potable water treatment plants to subject the water to a number of pretreatment steps. Following pretreatment, the pretreated water is filtered in one or more granular coal or sand filter beds.

As one pretreatment step, water is mixed with chemicals to coagulate particles in the water. This chemically treated water may be fed directly to the downstream filter beds. However, especially when the water has a heavy solids content, the filter beds tend to clog relatively quickly. As a result, significant amounts of backwash water is used to frequently clean the filter beds. Also while being cleaned, the filter beds may be out of service. Thus, excessive cleaning reduces the overall efficiency of the treatment plant because of the filter downtime.

To partially overcome these problems, chemically treated water is sometimes subjected to additional pretreatment steps prior to filtration. For example, a water and coagulant chemical mixture may be passed through a flocculation zone. In such a zone, gentle mixing takes place so as to promote flocculation of the solids without undue solids dispersion. From the flocculation zone, the partially pretreated water may be directed to a sedimentation basin. Solids settle in such a basin prior to final filtration. With these additional steps, the rate of plugging and head loss development in downstream filter beds is reduced. Also, cleaning water requirements are reduced. However, these added steps increase the costs of a treatment plant.

Sometimes water treatment plants, especially potable water plants, utilize additional water purification stages following an initial filter bed filtration stage. For example, filtered purified water is sometimes contacted with granular activated carbon in a fixed bed for final water polishing or purification. These carbon beds have been operated in an upflow mode, but are typically operated in a downflow mode to minimize the passage of carbon fines from the bed and into the finished water. As the water flows through these carbon beds, dissolved organic contaminants are adsorbed from the water. Eventually, the carbon becomes spent. That is, it ceases to effectively adsorb contaminants. When this happens, spent carbon is typically removed from the bed and thermally treated to regenerate it. Regenerated or previously unused fresh carbon is introduced into the bed to replace the removed spent carbon. These beds are relatively expensive in the first instance. Moreover, the active life of the granular carbon making up such beds is relatively short. Furthermore, prior art carbon beds known to applicant have suffered from the drawback of becoming quickly fouled unless the water being treated is very clear and free from suspended matter.

An exemplary activated carbon filter operated in an upflow mode, is shown in U.S. Pat. No. 4,202,770 of Gappa, et al. In the filter of Gappa, activated carbon moves downwardly through the filter in a direction countercurrent to the direction of the flow of waste water being treated. This migration is accomplished by removing contaminant laden spent carbon from the bottom of the filter, regenerating the carbon, and introducing fresh or regenerated carbon at the top of the filter bed. Like other known granulated activated carbon filters, the Gappa filter is used to purify previously filtered relatively pure water.

Another prior approach to water treatment, is described in U.S. Pat. No. 3,250,899 of Rice, et al. In Rice, fine powdered activated carbon and chemicals are added to untreated water in a plant. The mixture is then directed to a filter bed of sand. The carbon adsorbs organic materials from the water. As a result, the need for a post-filtration activated carbon bed is eliminated. However, these carbon fines penetrate the downstream filter bed and contribute to it's premature clogging. Also, it is difficult to efficiently recover costly used powdered carbon for subsequent reuse.

Therefore, a need for an apparatus and method which expands the possible uses of activated carbon beds in water treatment systems, which (a) takes advantage of the adsorption characteristics of carbon; (b) eliminates the need for the use of and problems associated with powdered carbon; and (c) incorporates the potential dual usage of granular carbon beds for adsorption as well as flocculation and suspended solids capture; (d) reduces the problem of clogging of granular activated carbon filtration beds, this latter problem having led others to limit the use of such beds to post-filtration or other pure water treatment applications.

SUMMARY OF THE INVENTION

In accordance with the present invention, a water treatment plant includes a granulated activated carbon bed for use in pretreating water prior to filtration of the water. The carbon bed, within a contactor, is designed to treat water with high concentrations of particulate materials without excessive head loss development or requiring an excessive use of backwash water.

The contactor is operable in one mode primarily as an adsorption granular activated carbon bed so as to adsorb organic materials from the pretreated water. Preferably, the bed is operated in a dual mode to accomplish (a) adsorption; and (b) filtration/clarification of the pretreated water or flocculation of pretreated water. In this dual mode, the contactor accomplishes the partial removal of particles prior to downstream filtration. As a result, the particulate loading on downstream filter beds is reduced.

The granular activated carbon bed may be operated in either an upflow or downflow mode. However, in the illustrated preferred embodiment, the system is operated in an upflow manner. With this construction, the bed is partially fluidized by pretreated water which flows up through the bed. Because of this fluidization, plugging of the bed with solids from the water is reduced. The forward flow rate of water through the bed is adjusted to control the volume to which the carbon bed expands. This adjusts the degree which the apparatus functions as a clarifier while still allowing its functioning as an adsorption device. The slower the upward water flow rate through the bed, the less the bed fluidizes and the greater the rate of solids capture by the bed. Conversely, the faster the upward water flow rate, the greater the fluidization of the bed and the easier the solids passage through the bed. Thus, by controlling the upward flow rate, the degree to which the bed functions as a clarifier or flocculation device is controlled. Also, the finer the size of the particles of the carbon bed, the greater the solids capture rate. However, the finer the media, the more subject the bed is to plugging. Thus, when operated in a dual capacity as an adsorption device and clarifier, the media particulate size is selected to perform satisfactory adsorption and clarification without undue clogging of the bed. Also, the coagulant chemical dosage affects the rate which solids are captured by the bed.

Portions of the carbon in the bed, when heavily loaded with contaminants, are selectively pulsed from the bottom of the bed for regeneration and subsequent reuse. Fresh carbon granules are transmitted to the top of the contactor to rejuvinate the bed.

Also, carbon fines which happen to leave the carbon bed during water processing are removed by one or more downstream filter stages of the plant. However, in comparison to the powdered carbon approaches of the prior art, the adverse impact of these carbon fines on the downstream filtration stages is much reduced.

Cleaning or flushing of the bed is accomplished by periodically or selectively increasing the rate which fluid flows upwardly through the bed. This expands the bed and dislodges trapped materials. These trapped materials may be diverted away from the downstream filter stages to a separate sedimentation basin or other treatment mechanism. In applications in which the contactor is functioning primarily to adsorb contaminants, the dislodged solids may simply be allowed to flow to the downstream filters where they are captured. Also, the beds may be backwashed to remove solids which happen to plug inlet screens through which influent water flows to the contactor. Effluent water from another contactor may be used for cleaning purposes. In this case, all of the water flowing through the plant, including cleaning water, is pretreated by a carbon bed.

For the purpose of the present application, certain terms used herein are defined as follows:

A coagulant is a material which will cause suspended particles in water to floc or to be altered so that they can be removed efficiently by filtration. The particles may be enlarged in size by the coagulant, or they may be adsorbed or enmeshed in a precipitate formed by the coagulant. Suitable coagulants include aluminum sulfate, ferric sulfate, ferric chloride, various organic polymers as well as other coagulants known to the art.

The term pretreated water is water, such as from a reservoir or a lake, or partially treated wastewater from a municipal wastewater treatment plant or other source, which is being processed by a water treatment plant upstream of any filtration bed of the plant.

The term pretreating water means processing pretreated water.

The term water treatment plant includes plants for treating unfiltered water from whatever source, including partially treated wastewater.

It is an object of the present invention to provide a new and improved water processing apparatus and method which includes a granular activated carbon bed designed for pretreating the water.

Another object of the invention is to provide a method and apparatus for pretreating water utilizing a granular activated carbon bed operable both for adsorption and clarification or flocculation purposes.

Still another object of the invention is to provide a method and apparatus for pretreating water in a granular activated carbon bed which minimizes the plugging of the bed with collected solids.

Another object of the invention is to provide a water pretreatment method and apparatus in which solids capture by a granular activated carbon bed is controllable.

Another object of the invention is to provide a method and apparatus in which the degree of clarification performed by a water pretreatment granular activated carbon bed is controllable by controlling the velocity of water flow through the bed.

A further object of the invention is to provide a method and apparatus which includes bed expansion and backwash cleaning means for effectively cleaning a granular activated carbon bed used in pretreating water.

Still another object of the invention is to provide a method and apparatus in which chemical coagulants may be added to pretreated water upstream of a granulated activated carbon water pretreatment bed to enhance the functioning of the bed as a flocculation device.

A further object of the invention is to provide a method and apparatus in which a granular activated carbon water pretreatment bed is replenished in a counterflow manner without concern for the problems normally encountered with carbon fines in finished water, such fines being removed by one or more downstream filtration stages of the treatment plant.

A further object of the invention is to provide such a method and apparatus utilizing a granular activated carbon water pretreatment bed which minimizes the need for flocculation and sedimentation basins when the carbon water pretreatment bed is useful for the dual purpose of flocculation and adsorption.

A still further object of the present invention is to enhance overall water treatment plant efficiency through factors such as adsorption taking place before chlorination of the water or pH adjustment, and the minimization of scale formation in the plant.

It is another object of the present invention to provide an apparatus and method by which organic materials and solids may be removed from water in an efficient cost effective manner.

A further object of the invention is to provide a method and apparatus in which a granular activated carbon bed may be successfully used to remove solids and organic materials from pretreated water in the presence of substantial amounts of turbidity in the water.

Still another object of the invention is to provide a granular activated carbon bed water pretreatment method and apparatus which may be readily incorporated in a presently existing water.

These and other objects, advantages and features of the invention will become apparent with reference to the description and drawings which follow.

DETAILED DESCRIPTION OF PREFERRED EMBODIMENT

Figure 1:
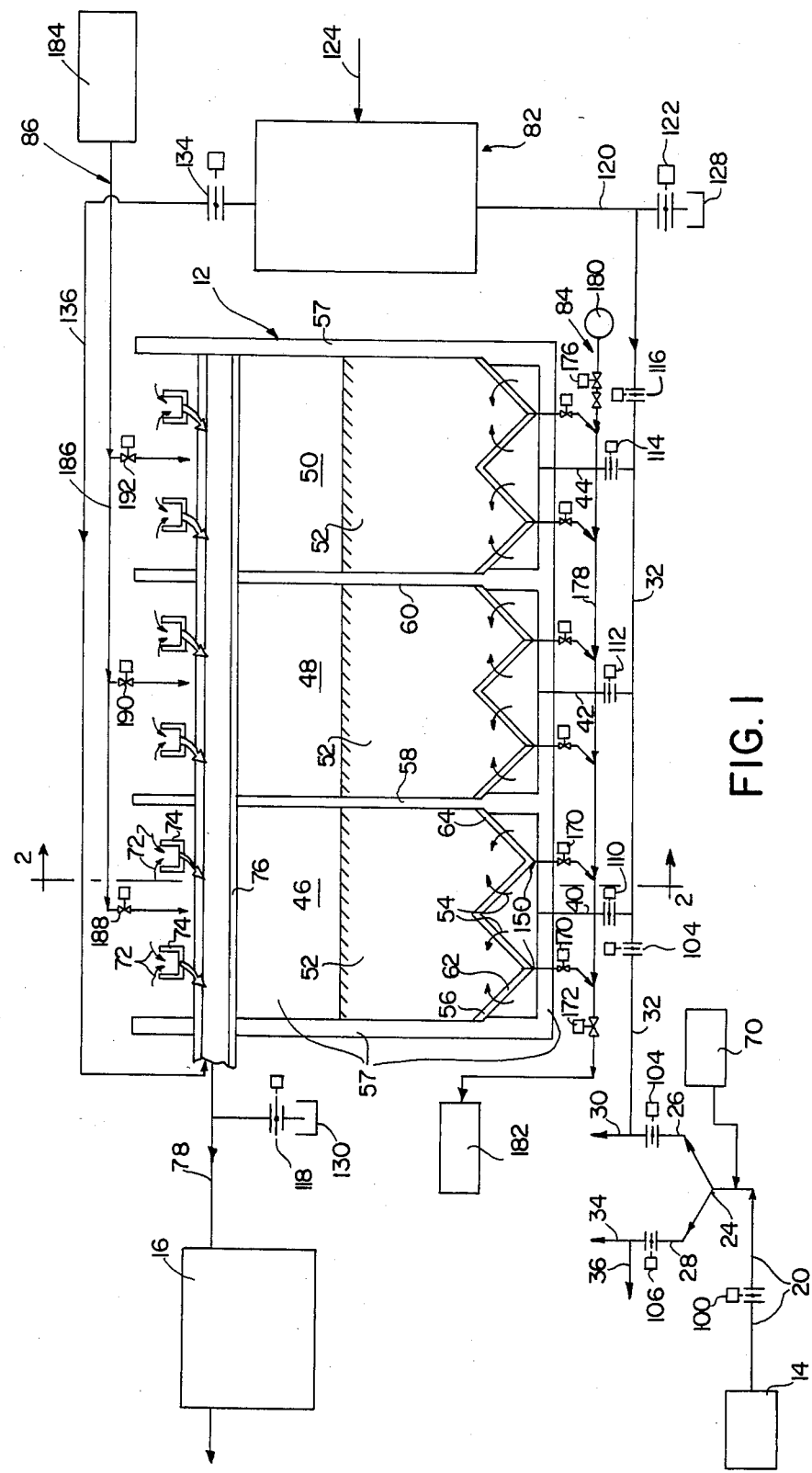
FIG. 1 is a schematic vertical sectional view of a water treatment plant in accordance with the present invention, including a granular activated carbon bed contactor for pretreating water.

FIG. 1 illustrates a water treatment plant in accordance with the present invention which incorporates a granulated activated carbon bed containing contactor 12. Water from a source 14 flows through and is pretreated by contactor 12 prior to being delivered to downstream treatment stages 16 of the plant. These downstream stages include one or more filters and may also include other treatment devices, such as sedimentation basins. The source 14 typically comprises a reservoir, lake, river, or other source of unfiltered water. Thus, the present invention utilizes a granulated activated carbon bed as an adsorption unit in a water pretreatment stage of the plant. Also, as explained below, the carbon bed is capable of being operated for a water flocculation and clarification purposes to reduce downstream solids loading of the stages 16. The use of a carbon bed in water pretreatment overcomes the drawbacks present in postfiltration carbon bed devices of carbon fines being entrained in the treated water. This is because fines in the effluent water from the contactor 12 will be filtered and removed to the desired degree by the downstream stages 16. At the same time, with the present invention, the amount of carbon fines in the water is very small in comparison to powdered carbon treatment techniques. Consequently, plugging of downstream filter stages 16 by carbon fines is minimized.

Figure 2:
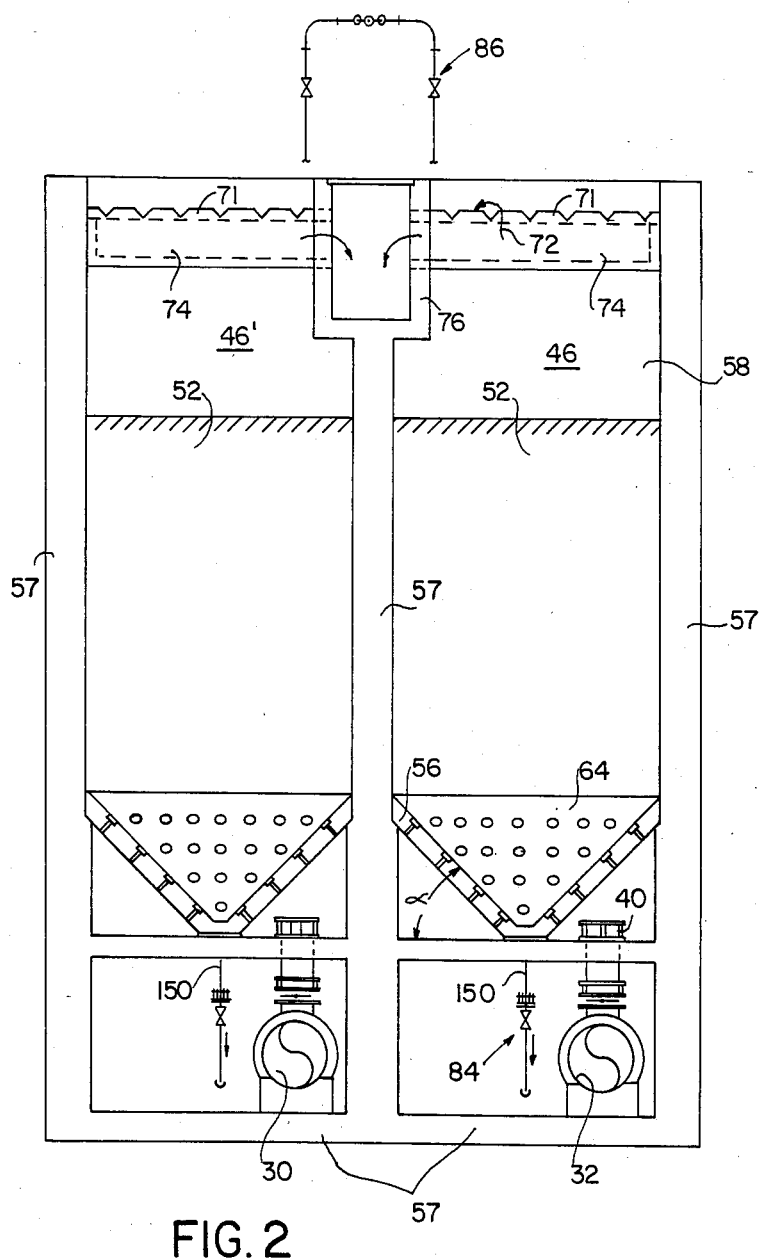
FIG. 2 is an enlarged vertical sectional view of a portion of the granular activated carbon bed contactor of FIG. 1, taken along lines 2—2 of FIG. 1.

In a large scale plant, plural contactors 12 are utilized. Each contactor comprises a rectangular upwardly opening tank 57 which is subdivided by transverse upright interior walls 58, 60 into three individually isolated cells 46, 48 and 50. As a specific example, cells 46, 48, 50 may be of rectangular cross-section, fourteen feet wide by twenty-eight feet long. As can be seen in FIG. 2, these contactors may be placed side by side with a common wall 57 between adjacent contactors. In FIG. 2, the cell corresponding to cell 46 in the adjacent contactor is identified as 46'. Referring again to FIG. 1, these cells each contain a granulated activated carbon bed 52. A range of granular activated carbon size particles are suitable, with the exact size being selected for the specific application. It is believed that carbon particles larger than 4 mesh (U.S. Standard sieve) are too large for satisfactory adsorption of contaminants from the water. In contrast, carbon particles smaller than 50 mesh are too small because a bed of such particles tends to plug with solids. Thus, carbon granules between these sizes are preferred to achieve the adsorption and flocculation and/or solids separation objectives. In the specific example under discussion, the contactor 12 is filled with 25,000 cubic feet of a uniform graded 12 by 30 mesh carbon. This grade was selected for one specific application as best meeting the objectives of adsorption and minimum plugging for that application. This carbon weighs approximately 700,000 pounds and has upwashed and settled density of about twenty-eight pounds per cubic feet. These cells are suitable for treating water of turbidity of up to 300 NTU (Nethelometric Turbidity Units) or higher.

Figure 6:
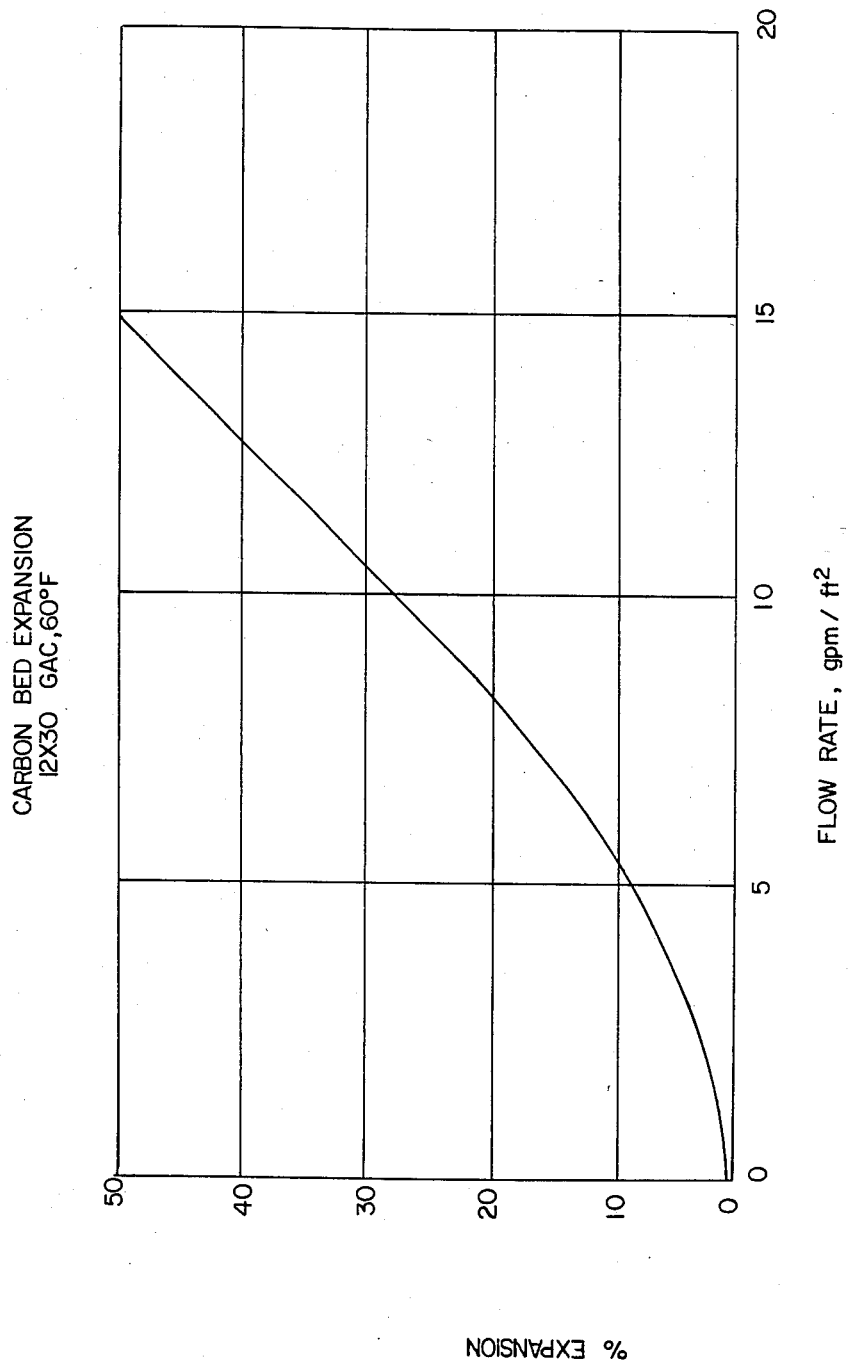
FIG. 6 is a chart plotting the percentage expansion of a granular activated carbon bed of the invention as a function of water flow rate through the bed.

Since each of these cells 46, 48 and 50 are of identical construction, only the operation of cell 46 will be described in detail. Water from source 14 is directed through a conduit 20, a branch 24 to a conduit 26, and then to a conduit 32. This latter conduit is in turn connected, via inlet pipes 40, 42 and 44 to the respective cells 46, 48 and 50 of the contactor 12. Water from conduit 40 enters the base of the cell 46 and flows upwardly, as indicated by arrows 54, through plural openings in a bottom hopper base 56 of the cell. The base 56 comprises respective first and second side-by-side inverted pyramidal shaped hoppers 62, 64. These hoppers, in the example, are of a fourteen feet by fourteen feet dimension at their widest point. Plural apertures are provided in hoppers 62, 64, for example on eighteen inch centers, as described below to permit the flow of pretreated water into the bed. Screened nozzles are positioned in these apertures, again as explained below, so that water entering the bed fluidizes the bed so as to allow the passage of solids through the bed while at the same time enabling the carbon bed to adsorb organic materials from the water. The tapered hopper design results in an increased velocity of water flow through the hopper as compared to the wider dimensioned cell above the hopper. This facilitates solids passage through the bed. Also, the less the fluidization of the bed, the more readily solids will be trapped in the bed, and vice versa. Since the fluidization of the bed increases with increasing water flow rates (see the chart of FIG. 6), the rate of solids capture is controllable and adjustable by controlling and adjusting the water flow rate through the bed. Thus, the flow rate may be established at a level which facilitates the functioning of the bed for both adsorption and water clarification, or solids capture, purposes.

To facilitate solids capture within the bed, coagulating chemicals may be added from a conventional coagulant supply mixing system 70 (FIG. 1) to the conduit 20. This enhances the dual role of carbon bed 52 in adsorption and flocculation. In the illustrated embodiment, coagulating chemicals and water in conduit 20 are delivered directly to the carbon beds 52 by way of branch 24, conduits 26 and 32 and inlet pipes 40, 42 and 44. Treated water from the cell 46 flows, as indicated by arrows 72, over notched weirs 71 (FIG. 2) and into transverse elongated troughs 74. These troughs empty into a longitudinally extending effluent channel 76. As shown in FIG. 1, channel 76 carries the partially treated water from contactor 12 to a line 78 and hence to the downstream stages 16. Although these downstream stages 16 may include a sedimentation basin in addition to filters, in certain applications desired water quality would be achievable with filters alone. Also, if it is desired that the cell 46 function primarily as an adsorption device instead in a dual adsorption and clarifier role, coagulation chemicals may be added downstream from contactor 12 at line 78. In this latter case, the stages 16 may also include a flocculation zone.

As solids accumulate in the cells 46, 48 and 50, it becomes necessary to clean the beds. To accomplish this cleaning, an upwash and backwash cleaning system 82 is provided and described in greater detail below. In addition, spent granular activated carbon is periodically removed from the bed. In the illustrated embodiment, contaminant laden carbon is removed from the bottom of the bed by a spent carbon removal system 84 (FIG. 1) and regenerated carbon is introduced by a regenerated carbon delivery system 86, at the top of the bed. Thus, the carbon migrates through the bed in a direction which is countercurrent to the normal flow of water through the bed. As a result, the most heavily contaminated carbon is removed. Also, disruption of the operation of the bed is reduced.

More specifically, a conventional automatically operated shut-off valve 100 is provided for closing the pretreated water influent line 20 leading to the system. Also, a similar valve 102 in line 26 controls the flow of water to line 32 and another line 30. Line 30 leads to another contactor, not shown in FIG. 1, but which includes cell 46' in FIG. 2. Also, a valve 104 (FIG. 1) controls the flow of pretreated water through line 32 to the cell inlet pipes 40, 42 and 44. A similar valve in line 30 not shown, is provided for the same purpose. This latter valve, together with the valve 104, balance the flow of water evenly between the contactors. Also, a line 28 from branch 24 leads to conduits 34 and 36 which are in turn are connected to additional contactors. A valve 106 is operated in conjunction with valve 102 to balance the flow between the branches 26 and 28. The above described valves are used to evenly balance the flow of pretreated water through the contactors of the plant and also to selectively shut off portions of the system, such as during cleaning. In the same manner, additional contactors may be added to the plant as desired.

In addition, valves 110, 112, 114 are provided in the respective lines 40, 42 and 44 to control the flow of water into the associated cells 46, 48 and 50. During normal operation, the water flow rates are adjusted by these valves to even the flow between the different cells. During normal operation, valves 116 and 118 of the cleaning system 82 are closed. With valves 100, 102, 104, 110, 112 and 114 opened and valves 116 and 118 closed, water from the reservoir 14 flows upwardly through the respective conduits 40, 42, 44 through the granulated carbon beds 52 of cells 46, 48, 50, and to troughs 74. From troughs 74, the pretreated water is directed to effluent channel 76 and then by the conduit 78 to downstream filter stages 16.

The water flow rate is adjusted by these valves so as to expand the carbon beds somewhat to permit a desired amount of solids passage simultaneously with adsorption of contaminants by the bed. Bed expansion, and therefore solids capture, is controlled by the flow rate and particle size. For a given flow rate, the smaller the particle size, the greater the bed expansion. Typically, a 5 to 15 percent bed expansion is desired. In particular, the desired flow rate is established to fit the adsorption and clarification goals of a particular application. Common rates would range from two to twelve gallons per minute per square foot of bed. However, more typically, flow rates of six to ten gallons per minute per square foot of bed are employed. Under these latter conditions, the bed expands approximately ten to twenty-five percent, thereby reducing the overtrapping of solids in the bed, which would create an unnecessary head loss. At the same time, the bed does collect some solids.

At predetermined time intervals, or when the head loss as detected by conventional detectors (not shown), reaches a predetermined level, an upwash bed cleaning is performed. To accomplish this cleaning, valve 104 is closed and valve 116 is opened. This permits the cleaning system to pump cleaning water on line 120 to conduit 32 and the respective cells 46, 48 and 50. Cleaning system 82 includes pumps for this purpose with cleaning water being supplied on a line 124 to the cleaning system. A valve 122 in line 120, discussed below, is closed during such times. The cleaning water is delivered at flow rates which causes bed expansion and dislodgment of accumulated solids from the beds. By applying cleaning water at a rate which results in an approximately 20 to 40 percent bed expansion, flushing of captured solids from the bed is accomplished. To minimize the required capacity of cleaning pumps, only one of the valves 110, 112 and 114 is opened at a time during cleaning. The solids containing cleaning water flows from the beds to effluent channel 76. In applications where contactor 12 is used primarily for adsorption and not clarification, these solids are directed to the downstream treatment stages 16 where they are removed in a conventional manner. However, when the contactor 12 is performing both adsorption and clarification functions, to reduce the solids load on downstream stages 16, during cleaning, a valve in line 78 (not shown) is closed and the solids are diverted via an opened valve 118 to a settling basin or other treatment zone 130. It is advantageous to use carbon pretreated effluent from other contactors of the plant in this upwashing cleaning operation. In such a case, line 124 may be connected to the effluent line of another so that all of the water reaching the stages 16, including cleaning water is carbon bed pretreated.

Also, the openings or inlets through which water flows through hoppers 62, 64 and into the cells may at times become clogged with solids. To dislodge these solids, a backflushing cleaning process is used. With valves 104, 118, and the valve in line 78 closed, and valves 110, 112, 114, 116, 122 and a valve 134 opened, this backflushing operation takes place. Water in the cells 46, 48 and 50 drains downwardly through the inlets and carries the dislodged solids to conduit 32. From conduit 32, the solids are carried through valve 122 to a settling basin 128. Alternately, valve 122 may lead to a line connected to downstream stages 16 wherein solids removal is performed. During this backwash cleaning, supplemental makeup water is pumped from cleaning system 82 through the valve 134 and a conduit 136 to trough 76. From trough 76, the makeup water flows backwardly through channel 74 and into the top of the respective cells. As in the upwashing operation, backwashing make-up water may be obtained from the effluent of another contactor of the plant. In this case, backwash cleaning water reaching downstream stages 16 is also carbon bed pretreated.

Figure 3:
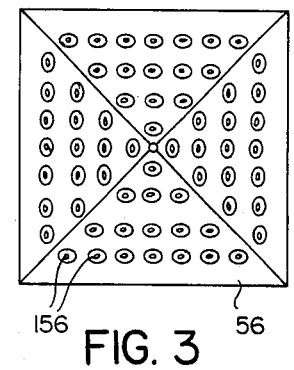
FIG. 3 is a bottom view of a hopper portion of the contactor of FIG. 2.
Figure 4:
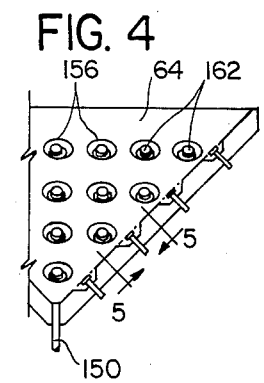
FIG. 4 is a cross sectional view of a portion of the hopper of FIG. 3.
Figure 5:
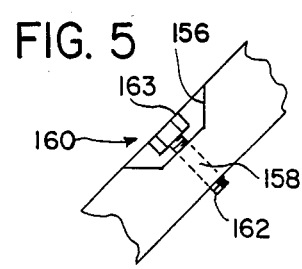
FIG. 5 is an enlarged view of a screened nozzle inlet to the hopper of FIG. 4.

With reference to FIGS. 1, 2 and 3, the hoppers 62, 64 will next be described. These hoppers have inclined upper surfaces which taper to a carbon removal outlet 150. In the illustrated embodiment, each of these hoppers, best seen in FIG. 3, is of an inverted pyramidal construction and may be precast of concrete. Also, the angle $\alpha$ between the upper surface of the hopper wall and horizontal, is approximately 45°. These hoppers are formed with plural frustoconical recesses 156, in their upper surfaces as shown in FIGS. 4 and 5. In the FIG. 5 form, these recesses are on eighteen inch centers, are twelve inches in diameter at the upper surface of the hopper and six inches in diameter at their base, and three inches deep. An aperture 158 is provided through the hopper wall at each of these recesses. Conventional nozzles 160 are provided with one such nozzle being inserted through each recess. These nozzles each have an upstream nipple 162 which provides an inlet to the nozzle and thus to the cell. The nozzles fluidize the granular activated carbon of the bed. Also a screen 163 surrounds each of the nozzles. In the FIG. 5 form, these screens comprise a four inch diameter, two inch high, SST wedge wire screen. These screens distribute the flow of water across the contactor bed. As can be seen with reference to FIG. 3, these nozzles are distributed in horizontal rows throughout the surface of the hopper 56. Other configurations which distribute the flow of water from conduit 32 generally uniformly across the bed surface are also suitable.

With this construction, when the carbon removal conduit 150 is open, the combination of the fluidized bed and the tapered hopper causes removal of a cross-section or plug of the bed through the conduit 150. Thus, the most heavily contaminant laden carbon, even from along the sides of the cell, is removed. More specifically, referring again to cell 46 of FIG. 1, spent carbon is removed as follows. Carbon purging valves 170, 172 and 176 are opened. Thereupon, carbon passes downwardly through the conduits 150 and into a carbon transport line 178. A source of pressurized water 180 moves the carbon along line 178 to a conventional carbon regeneration plant 182. In plant 182, the carbon is heated and cleaned to reactivate it for reuse. Each cell 46, 48 and 50 is typically purged of spent carbon in series. In the specific example previously mentioned, in approximately 30 to 60 minutes, about 2500 pounds of carbon is removed from a hopper. Although variable, approximately five to ten percent of the carbon is typically removed from a contactor each time that the contactor beds are cleaned in this manner. The frequency of carbon removal depends upon the rate of solids capture by the bed. From regeneration area 182 the regenerated carbon may be conveyed to a carbon storage area 184. From storage area 184, the carbon is transported as needed on a line 186 through respective valves 188, 190 and 192 to the cells 46, 48 and 50. This replenishes the carbon in these cells. Thus, countercurrent migration of carbon through the apparatus for purposes of cleaning the bed is achieved without disrupting the operation of the treatment plant.

If the contactor is operated in a downflow manner, all of the carbon in the contactor is typically removed at one time and replaced with fresh carbon. This is somewhat less efficient than pulse removal of portions of the carbon bed as previously explained.

One specific test of a carbon contactor used for adsorption and flocculation purposes has been performed. In this test, a small carbon contactor was constructed and operated in an upflow manner. Water with a relatively high concentration of coagulated particles was delivered to the test apparatus. In this specific test, it was desired to operate the contactor in a partially fluidized manner to pass flocculated solids and minimize head loss build-up in the contactor itself.

To perform the test, a non-standard 12 by 30 mesh sample of granular activated carbon was obtained. This sample was produced by screening a commercially available 12 by 40 mesh carbon through a 30 inch mesh screen, and discarding the 30 mesh material. This gradation of carbon was selected to improve the bed expansion and solids passage characteristics of the contactor, while only moderately affecting the adsorption characteristics of the bed. In particular, a 12 by 30 granular activated carbon bed was selected to achieve the adsorption and flocculation clarification goals. In the test, the carbon contactor bed was operated at an initial rate at 6.1 gallons per minute per square foot of bed. This produced approximately a 10 percent initial bed expansion. Although possible, no attempt was made to increase the flow rate to compensate for head loss developed in the carbon contactor during the test. The initial head loss was equivalent to 1.7 inches per foot of carbon depth. After 48 hours, the flow rate had dropped a modest amount to approximately 5.3 gallons per minute per square foot of bed. In addition, the bed expansion had dropped to about 9 percent. Also, the head loss had decreased slightly to 1.5 inches per foot of carbon depth. In addition, at the end of the 48 hour test, the contactor was operating to reduce the turbidity of the water passage through the contactor from 7.5 NTU to a 2.9 NTU. The upflow rate was then subsequently increased to approximately a 30 percent bed expansion. This readily flushed captured solids from the carbon bed. Following cleaning, the flow rate and head loss in the contactor bed returned to the initial conditions.

Although limited, this test confirmed that a granular activated carbon bed is capable of operating in a dual mode to both collect solids and adsorb contaminants. Finally, utilizing a water pretreatment granular activated carbon bed ahead of downstream filter stages also offers other advantages. For example, scaling of the carbon bed with $CaCO_3$ is not a problem as the bed may be upstream of a lime treatment stage. Also, plant chlorine requirements may be reduced. In addition, better carbon utilization is possible because of lower water pH.

Having illustrated and described the principles of my invention with reference to one preferred embodiment, it should be apparent to those persons skilled in the art that such invention may be modified in arrangement and detail without departing from such principles.

I claim as my invention all such modifications as come within the true spirit and scope of the following claims:

1. A water treatment plant comprising:
water pretreatment means having a pretreatment inlet for receiving pretreated water and a pretreatment outlet for delivery of water from the pretreatment means, said water pretreatment means defining a pretreatment water flow path between the pretreatment inlet and the pretreatment outlet and including at least one granular activated carbon bed means in said pretreatment flow path, said carbon bed means comprising carbon granules greater than or equal to the size of particles resulting from screening carbon through a 50 mesh screen, and less than or equal to the size of particles resulting from screening carbon through a 4 mesh screen, whereby said carbon bed means performs a dual function as an adsorption zone and flocculating zone;
said pretreatment means further including means for adding coagulating chemicals to said water at a location upstream of the carbon bed means and for delivering the coagulating chemicals and water to the carbon bed means;

water delivery means for delivering pretreated water upwardly into and through said carbon bed means at a flow rate sufficient to expand the bed up to approximately 30%, said water delivery means including means for adjusting and controlling the flow rate of water to said carbon bed means to control said carbon bed expansion and the degree of solids collection by said carbon bed means;

downstream water treatment means including a first inlet coupled to the water pretreatment outlet for receiving pretreated water from said water pretreatment means and a first outlet for delivery of treated water from said downstream water treatment means, said downstream water treatment means defining a first water flow path between said first inlet and first outlet, said downstream water treatment means including at least one filter means in said first water flow path for filtering the water received from said water pretreatment means;

cleaning means for delivering cleaning water to the pretreatment inlet of the carbon bed means at a rate which expands the carbon bed in an amount sufficient to flush collected solids from the bed, said cleaning means further comprising cleaning water supply means for supplying cleaning water which has been pretreated by passage through a carbon bed means, and means for diverting cleaning water and solids at the pretreatment outlet away from the first inlet of the downstream treatment means;

backwash cleaning means for passing water in a countercurrent direction through the pretreatment water flow path, said backwash cleaning means comprising means for supplying backwash cleaning water which has been pretreated by passage through a carbon bed means, said backwash cleaning means also including means for delivery of solids containing backwash cleaning water which has passed through the carbon bed means to the first inlet of the downstream water treatment means; and means for selectively removing contaminated carbon from the lower portion of the carbon bed means and for introducing fresh carbon at the top of the carbon bed means.

2. A water treatment plant according to claim 1 in which the water pretreatment means includes means for delivering the coagulating chemicals and water directly to the carbon bed means.

* * * * *